Feb. 5, 1935. H. H. KEEN 1,989,867
RECORD CARD CONTROLLED MACHINE
Filed May 11, 1933 6 Sheets-Sheet 3

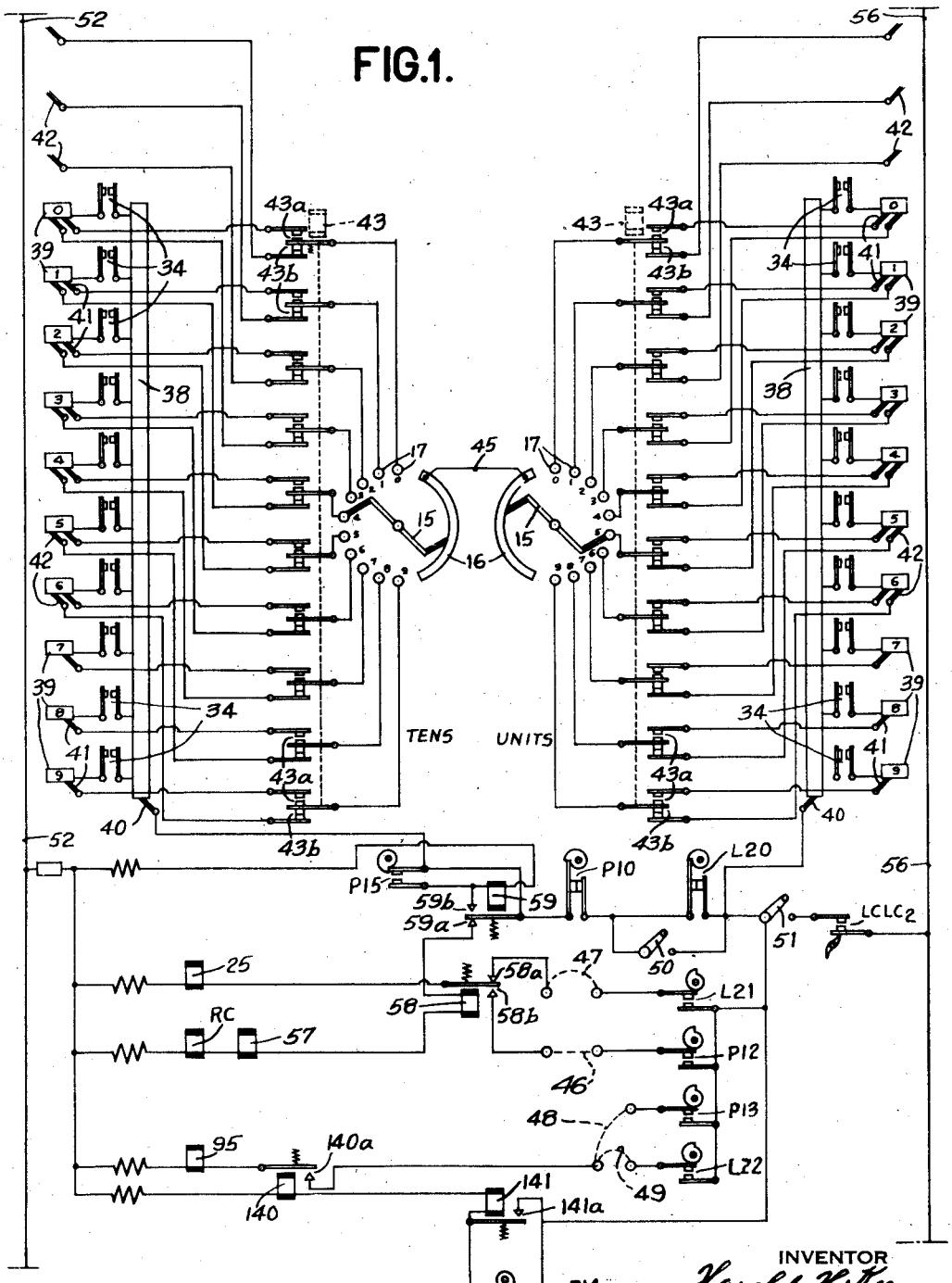

INVENTOR
Harold H. Keen
BY
ATTORNEY

Feb. 5, 1935.  H. H. KEEN  1,989,867
RECORD CARD CONTROLLED MACHINE
Filed May 11, 1933   6 Sheets-Sheet 4

INVENTOR
Harold H. Keen
BY
ATTORNEY

Feb. 5, 1935.  H. H. KEEN  1,989,867
RECORD CARD CONTROLLED MACHINE
Filed May 11, 1933  6 Sheets-Sheet 5
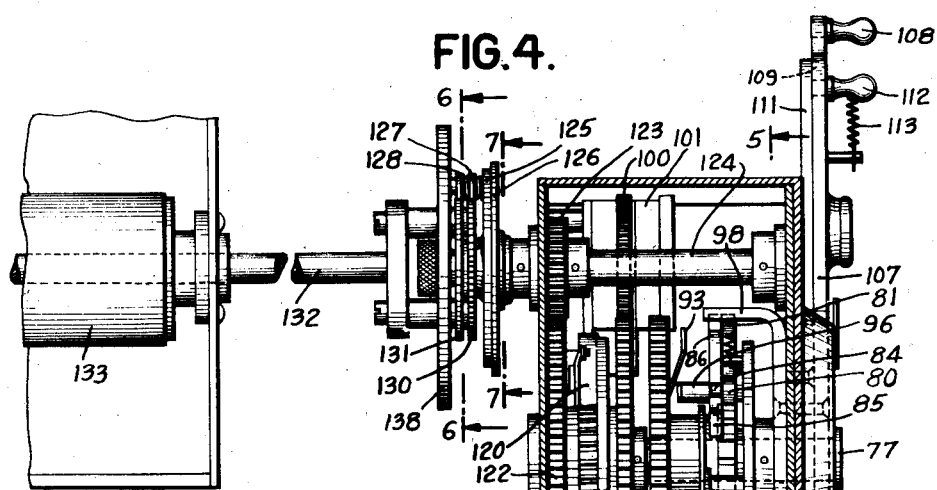
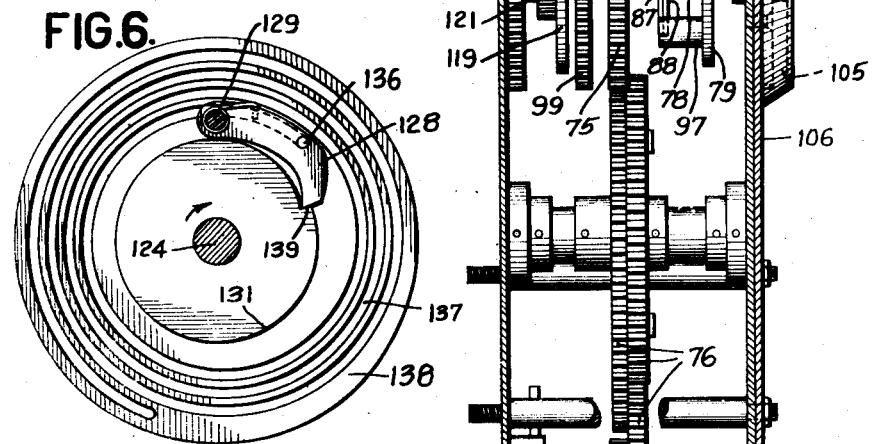
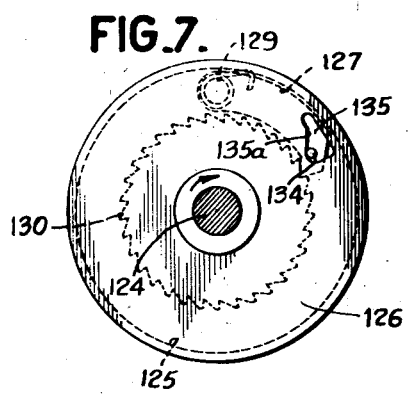

Feb. 5, 1935. H. H. KEEN 1,989,867
RECORD CARD CONTROLLED MACHINE
Filed May 11, 1933 6 Sheets-Sheet 6

INVENTOR
Harold H. Keen
BY
W. M. Wilson
ATTORNEY

Patented Feb. 5, 1935

1,989,867

UNITED STATES PATENT OFFICE 1,989,867

RECORD CARD CONTROLLED MACHINE

Harold Hall Keen, Letchworth, England, assignor, by mesne assignments, to International Business Machines Corporation, New York, N. Y., a corporation of New York Application May 11, 1933, Serial No. 670,404
In Great Britain May 23, 1932

6 Claims. (Cl. 235—92)

The present invention is concerned with record card controlled machines by which amounts or other data read from the cards and/or totals of such amounts can be printed. It is the usual practice to arrange the cards in groups each designated by a serial number and to provide each card with group holes representing the serial number of the group to which that card belongs. By sorting the cards into groups arranged in serial order and passing them through a statistical machine it is possible to prepare a return on which the printed data for the various groups is arranged in serial order on a report strip. It is also possible to arrange for the printed data for each group to occupy the same length of the report strip so that the latter may be divided, if desired, into sheets of equal length each containing data relating to a particular group. Mechanism is also known by which a series of separate sheets may be fed to the printing mechanism in such manner that the data relating to each group is printed on a separate sheet.

Hereinafter the term "sheet" will be employed to denote the separate sheet of paper or the portion of a strip of paper which receives the data relating to a single group of cards and the term "strip" to denote a series of connected sheets of paper. The term "line spacing mechanism" will be employed to denote mechanism by which a "sheet" or "strip" is spaced to receive successive printed lines and the term "sheet feeding mechanism" by which a "sheet" is fed into position to be printed on. In cases where each "sheet" of a connected strip is only long enough to receive a single entry, the sheet feeding mechanism may be constituted by the line spacing mechanism but in other cases it will usually be a separate mechanism.

The present invention has for its object to provide means by which the machine can prepare a return containing a "sheet" for each group of a series of groups (each of which may comprise only a single card) irrespective of whether or not any cards relating to that group have been passed through the machine so that if there are no cards relating to a particular group a blank "sheet" will be produced.

The invention provides two number representing devices adjustable to represent related numbers from two successive cards, and cycle controlling means operable under the joint control of the two number representing devices to cause the machine to perform a series of repeated cycles, the number of which is determined by the difference between the numbers represented by the devices.

According to the present invention the machine is also provided with printing mechanism for printing data derived from each of a series of groups of cards, and "sheet feeding" mechanism operable under the control of the cycle controlling means to feed a new "sheet" to the printing mechanism during each cycle initiated by the cycle controlling means. With this arrangement a "sheet feeding" operation will take place for each possible group in a series irrespective of whether or not the series is complete. Thus, assuming that group No. 41 is followed by group No. 46, five sheet feeding operations will take place, four corresponding one to each of missing groups Nos. 42, 43, 44 and 45 and the fifth to the new group No. 46.

Preferably, one of the number representing devices is arranged to be advanced one unit as an incident to each cycle of a series of cycles and the other to be adjusted under the control of the card next to control the machine and the cycle controlling means is operable, when both devices represent the same number, to end the series of repeated cycles.

It is a feature of this invention to employ "sheet feeding" mechanism which is operable, during each of its cycles of operations, to feed a paper "strip" to an extent equal to the difference between a predetermined number of line spaces and the number of line spaces through which the strip has been fed by line spacing mechanism since the previous cycle of operations of the "sheet feeding" mechanism so that the strip may be divided into separate sheets of equal length.

Conveniently the "sheet feeding" mechanism is arranged to perform a cycle of operations during each total printing cycle of the machine and the cycle controlling means is arranged to cause the machine to perform repeated total printing cycles. With this arrangement a total printing cycle, and sheet feeding operation, will take place for each possible group in a series including any missing groups. When however the "groups" each comprise only a single card and the machine is employed to list the amounts read from the cards, it is preferred to arrange the "sheet feeding" mechanism to operate during card feeding cycles as well as total printing cycles so that it is not necessary to perform a total printing cycle for each card present. With this latter arrangement a card feeding and printing cycle occurs for each card present in the series and a total printing cycle occurs for each card absent from the series so that a "sheet" is fed for every possible card in the series but unnecessary total printing cycles are eliminated.

A preferred embodiment of the present invention will now be described by way of example only, with reference to the accompanying drawings in which:

Figs. 1 and 1a, taken together, are a circuit diagram showing the circuits of a tabulating machine to which the invention is applied.

Fig. 4 is a front elevation of auxiliary sheet feeding mechanism employed in the machine.

Figure 5:
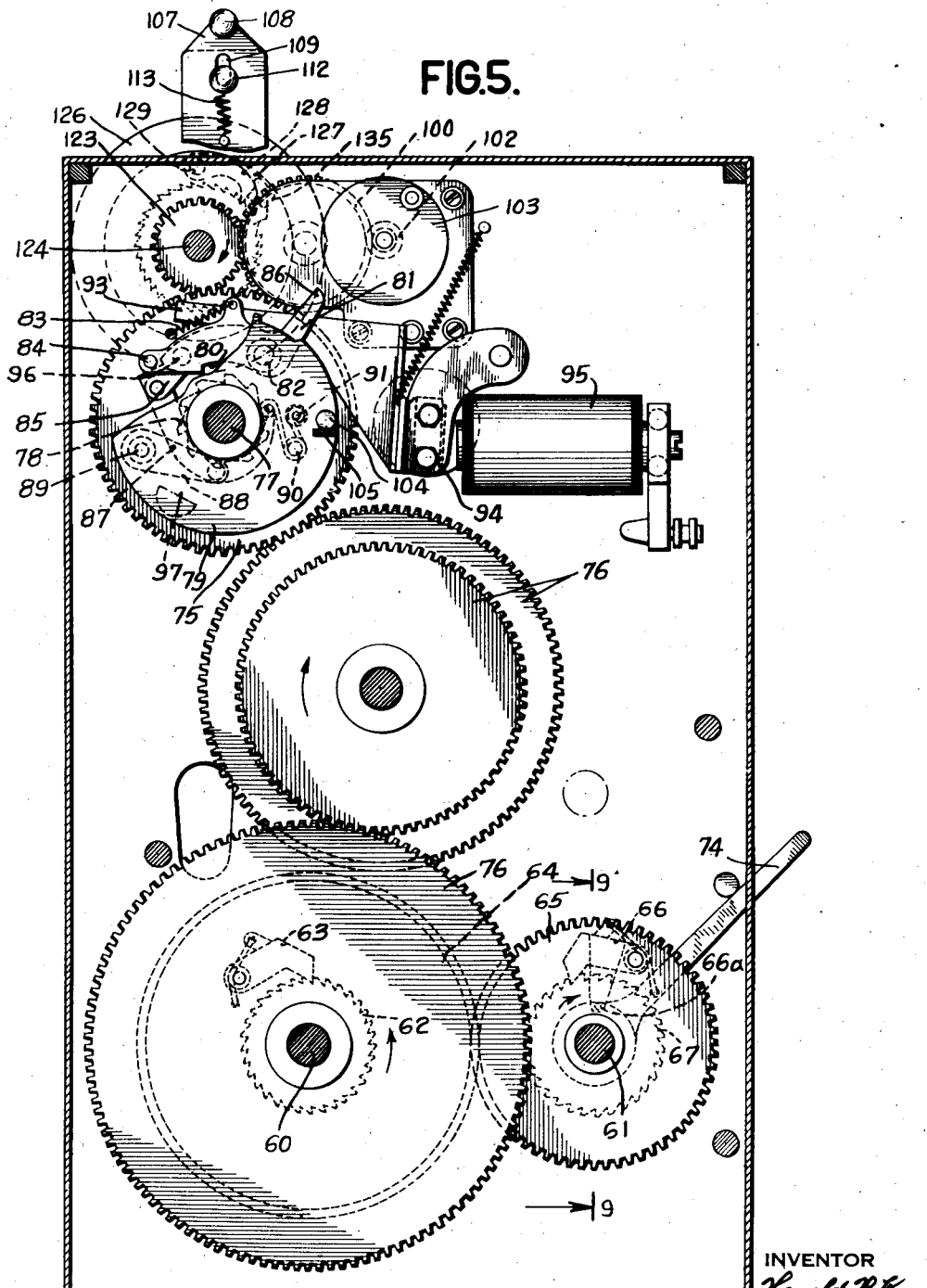

Figs. 5, 6 and 7 are sections on the lines 5—5, 6—6 and 7—7 respectively of Fig. 4.

Figure 8:
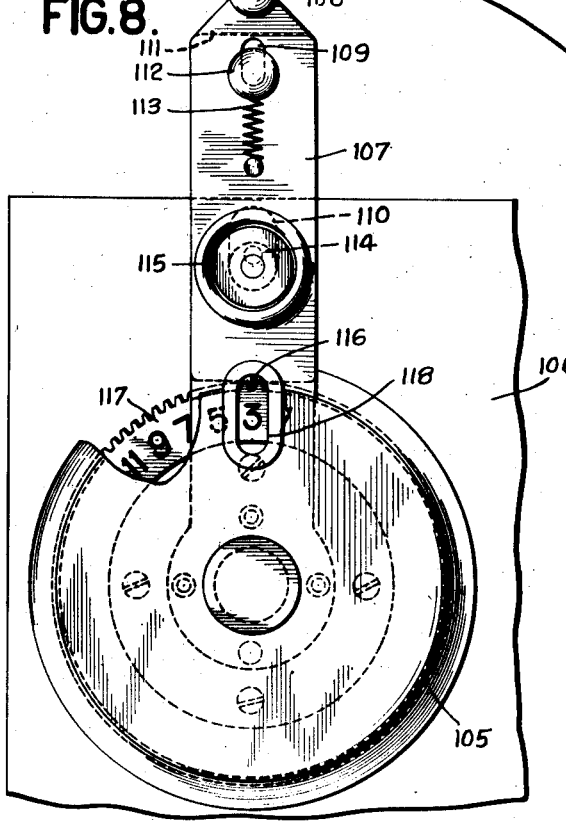

Fig. 8 is an end elevation as seen from the right of Fig. 4 of a portion of the sheet feeding mechanism.

Figure 9:
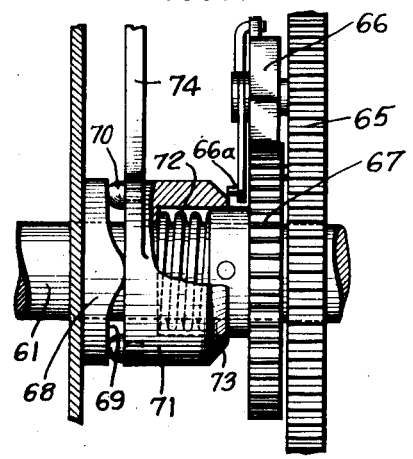
Figure 10:
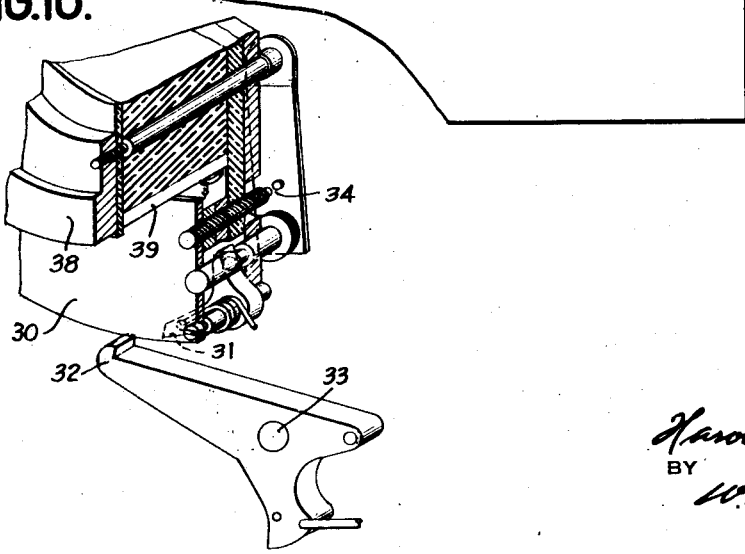

Fig. 9 is a section on the line 9—9 of Fig. 5, and Fig. 10 is a detail in perspective of certain contact devices.

Like reference numerals indicate like parts in all the figures of the drawings.

The invention will be explained as applied to a record card controlled statistical machine of the well-known kind described in United States Patent No. 1,762,145, to G. F. Daly and R. E. Page, issued June 10, 1930. The machine will only, therefore, be described sufficiently for an understanding of the present invention.

Figure 2:
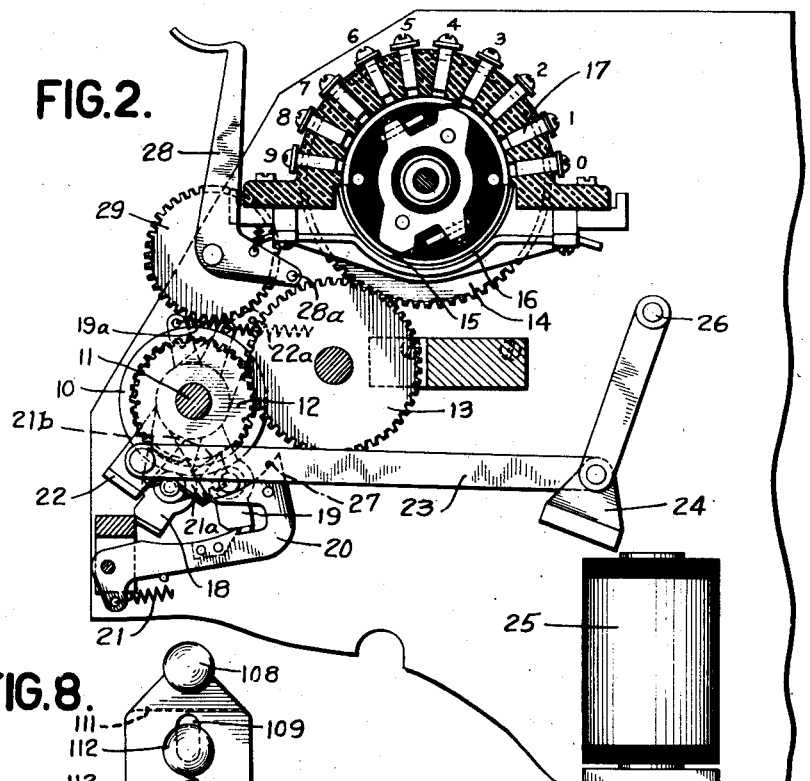
Fig. 2 is a section through a units counter provided in the machine.

Referring to Fig. 2, the machine is provided with a number representing device constituted by a units counter. The counter comprises two adding wheels 10, each of which is loosely mounted on the shaft 11 and is secured to a gear wheel 12. Each gear wheel 12 meshes with an idler gear wheel 13 which in turn meshes with a gear wheel 14. Each gear wheel 14 carries a pair of brushes 15 which are electrically connected together. One of these brushes engages a common segment 16 and the other, one of ten studs 17, there being a segment 16 and set of studs for each of the two pairs of brushes. The studs 17 are allocated each to a separate digit and each pair of brushes 15 connects the corresponding common segment 16 to the stud 17 corresponding in value to the digit represented by the position of the corresponding adding wheel.

The adding wheel 10 shown in Fig. 2 is a units wheel while the other, which is behind the wheel shown, is a tens wheel. A carry lever 18 is associated with the units wheel 10 and is normally held in the position shown by a suitable spring. A similar carry lever 19 is associated with the tens adding wheel and is urged clockwise by a suitable spring. This lever 19 is normally latched in the position shown by a carry latch 20 that is urged counterclockwise by a spring 21. Each carry lever carries a pawl 21a spring pressed against a ratchet wheel 21b secured to the associated adding wheel.

A bail 22 is pivoted on the shaft 11 and is connected by a link 23 to the armature 24 of an electromagnet 25. The armature 24 is pivoted at 26, and the bail 22 and armature 24 are held in the position shown by a suitable spring 22a tending to rock the bail clockwise.

When the magnet 25 is energized, it attracts its armature 24 and rocks the bail 22 counterclockwise. The bail 22 engages and rocks the carry lever 18 counterclockwise and the pawl 21a carried by this lever engages a tooth in the associated ratchet wheel 21b and feeds the units wheel 10 one step. On the deenergization of the magnet 25, the parts return to the position shown, the pawl 21a moving past the next tooth on the ratchet wheel and engaging behind it. When the units wheel has been advanced to the position representing nine, an extra high tooth in the ratchet wheel is engaged by the units pawl as the carry lever 18 rocks clockwise in the deenergization of the magnet 25. The units pawl overlies an arcuate portion 27 of the latch 20 and is depressed by the high tooth sufficiently to rock the latch 20 free of the tens carry lever 19. The latter is then rocked clockwise by its spring 19a so that on the next actuation of the bail 22 both carry levers will be rocked counterclockwise and both adding wheels will be advanced one step. The tens carry lever 19 is then relatched and remains latched until the units wheel 10 again registers nine. In this manner the units wheel 10 is advanced one step for each energization of the magnet 25 and transfers from the units to the tens wheel are effected.

Each adding wheel can be manually adjusted to any desired position by depressing a lever 28 pivoted at 28a as to mesh a gear wheel 29 with the gear wheel 13 and then rotating the wheel 29 until the adding wheel is in the desired position. In this manner the units counter can be set initially to register any desired two figure number.

Figure 3:
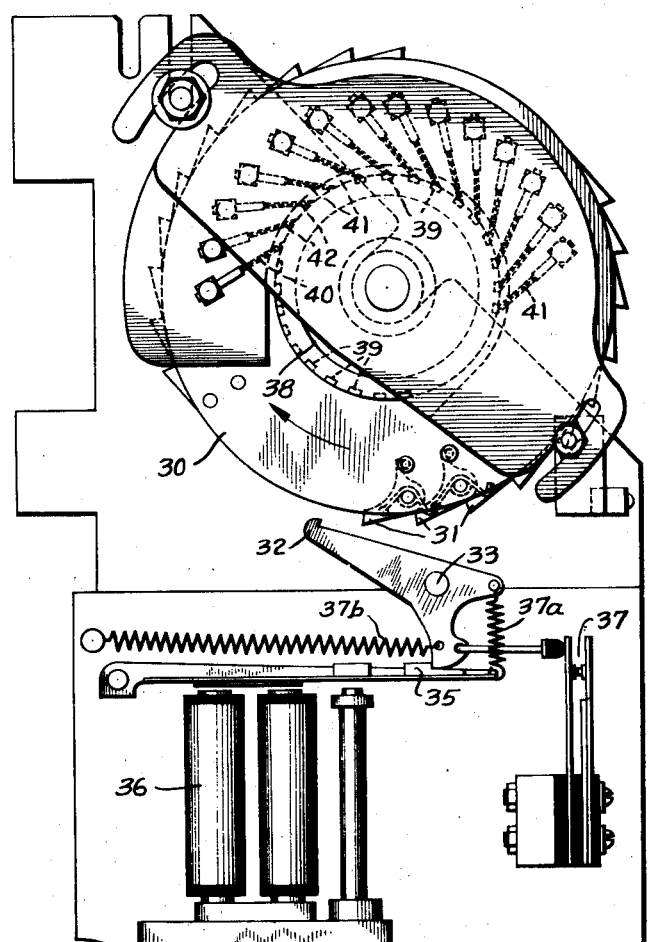
Fig. 3 is a side elevation of a number registering device employed in the machine.

The machine is provided with a second number representing device constituted by two so-called "translators" one of which registers a units digit and the other a tens digit. One of these translators is shown in Fig. 3 and they are generally similar to "impulse changing devices" described in British Patent No. 288,516 except that they are arranged merely to store the reading from the card and not to change the order of the impulses. Each device comprises a disk 30 having two sets of ten latches 31 pivoted on it. The disk is rotated so as to turn through half a revolution during one card reading cycle of the machine and so that each latch 31 in a set comes into operative relationship to the nose of a trip lever 32 at the moment when a corresponding line of index point positions of a card passes a row of analyzing brushes. Each latch 31 normally holds an associated pair of contacts 34 (Fig. 10) open, there being two sets of ten pairs of contacts, a pair of contacts in each set for each digit. The trip lever 32 is pivoted at 33 and is normally latched in the position shown in Fig. 3 by the armature 35 of a magnet 36. One of the two magnets 36 is connected through normally closed contacts 37 in series with the upper brush reading the units column of a group number field in the cards and the other with the upper brush reading the tens column in that field. When a hole is encountered by one of these upper brushes the corresponding magnet 36 is energized and attracts its armature 35, releasing the corresponding trip lever 32 which is rocked clockwise by springs 37a and 37b, and allows the contacts 37 to open and deenergize the magnet 36. The nose of the trip lever engages one of the latches 31 and rocks it so that it unlatches the corresponding pair of contacts 34 which then close. The movement of the latch 31 also rocks the trip lever back to the position shown in Fig. 3 where it is relatched.

In this manner the units and tens digits represented by holes in a card are represented by the closure of a pair of contacts 34 in one set of contacts in each translator. These pairs of contacts remain closed during the next cycle while the card in question is passing a row of lower brushes and amounts on it are being added and/or printed in the usual manner. During this cycle a set-up is effected on the other sets of contacts of the translators. The closed contacts are opened just before the corresponding latches reach the trip levers by a cam in a known manner.

Figure 1A:
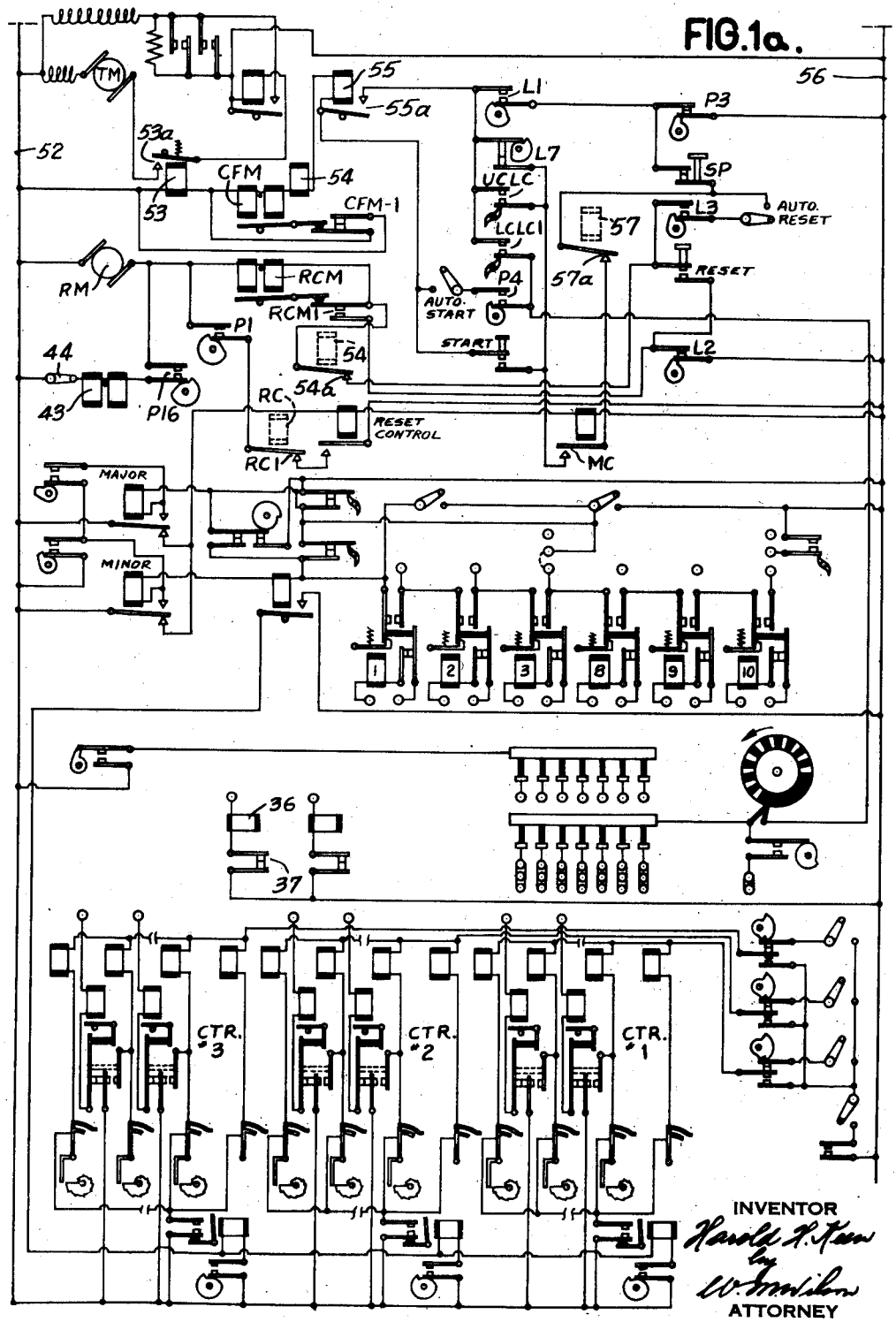

In Fig. 1 one set of the contacts 34 in each translator are shown. Associated with each set of contacts is a semi-annular common segment 38 connected to one blade of each pair of contacts 34 (see Fig. 10) and a set of ten segments 39 each connected individually to the other blade of a pair of contacts 34. These segments rotate with the disk 30 and the segments 38 cooperate with a brush 40 while the segments 39 cooperate with two sets of ten brushes 41 and 42. The brushes 41 are displaced axially from the brushes 42 and are advanced circumferentially by three steps.

The translators rotate only so long as the machine is performing card feeding cycles and come to rest in the position shown in Figs. 1 and 3 during total printing cycles. During the latter cycles each of the brushes 41 engages one of the segments 39 so that a connection is established through each translator from the brush (40) through the segment 38, the closed contacts 34, and one of the segments 39 to one of the brushes 41 depending on the digit registered in the translator. Each of the brushes 41 and 42 in a translator has thus a digital value and is connected through contacts 43a and 43b to a stud 17 having a similar digital value.

There are twenty sets of contacts 43a and 43b (but only two sets are shown for simplicity) and the contacts 43a are normally open while the contacts 43b are normally closed. The contacts 43a and 43b are controlled by a coil 43 in parallel with a reset motor RM. This motor drives the machine during total printing cycles and actuates all the contacts designated P and a suffix. When the motor RM is in operation, contacts P16 will close to complete a shunt circuit through the coil 43 and a switch 44 and the coil 43 closes the contacts 43a and opens the contacts 43b. In this manner the tens brushes 41 are connected to the tens studs 17 and the units brushes 41 to the units studs 17 during total printing cycles. If the tens digit registered by the units counter is the same as the digit registered by the tens translator the circuit through the latter will continue from the brush 41 through the connected contacts 43a, the connected stud 17, the tens brush 15 and segments 16, a line 45, the units segment 16 and brush 15, the units stud 17 engaged by the units brush, one pair of the contacts 43a to one of the units brushes 41. From here the circuit will continue through the units translator provided it is adjusted by the closure of the proper pair of contacts 34 to represent the same digit as that represented by the position of the units brush 15. Thus if the translators represent the same tens and units digits as those registered by the units counter, a series connection is established between the brushes 40 during a total printing cycle but if either the tens or the units digits differ, no circuit is established between the brushes 40.

There will now be explained the manner in which the machine prepares a statement setting out the totals of amouts read from each of a series of groups, each total on a predetermined line with a blank line for each missing group in the series.

It will be assumed that it is desired to prepare a statement from a series of groups of cards which groups are numbered 001 to 999 and are arranged in serial order. A paper strip is inserted in the printing mechanism of the machine and may be regarded as being divided into "sheets" each capable of receiving a line of print. The machine is adjusted to tabulate, that is to add amounts and print the total but not to list the amounts added. With this adjustment the strip will be fed one line space, that is one "sheet" length, by the usual line spacing mechanism during each total printing cycle.

The units counter (Fig. 2) is adjusted to register 00, switches 44, 50 and 51 are closed and a plug connection 46 is made, the connections shown at 47, 48 and 49 being omitted. The cards are placed in the machine which is started in the usual way so as to feed the first card past the upper brushes. Let us assume that this card belongs to group No. 001 so that 01 will be registered in the translators. As soon as the machine is started a circuit is established from a supply line 52, through a relay coil 53, a card feed clutch magnet CFM which holds contacts CFM1 open, an interlock relay 54, a motor relay 55, the contacts 55a of the relay 55, cam contacts L1 and P3 to another supply line 56. The contacts L1 and other contacts designated L and a suffix operate during card reading cycles only. The relay coil 53 closes contacts 53a to complete a circuit through a motor TM while the magnet CFM engages a clutch to couple the motor TM to the translators, card feeding mechanism and counters so that the latter are in operation. A shunt circuit round the contacts L1 extends from the contacts 55a through contacts UCLC closed by the cards passing the upper brushes or contacts L7 closed when the contacts UCLC open between cards, contacts MC (normally closed), contacts 57a and stop key contacts SP to the contacts P3.

Just before the first card reaches the lower brushes, it depresses a card lever and causes contacts LCLC1 and LCLC2 to close. The closure of the latter contacts (right bottom corner of Fig. 1) completes a circuit from the line 52 through relay coils RC, 57 and 58, normally closed contacts 59a, cam contacts P10, the switches 50 and 51, and the contacts LCLC2 to the line 56. The coil 57 then opens its contacts 57a so that the circuit through the magnet and coils 53, 54 and 55 are broken when the cam contacts L1 open at the end of the card cycle. The deenergization of the coil 53 results in its contacts 53a opening to deenergize the motor TM so that the feed of the cards is interrupted. The deenergization of the coil 54 results in the closure of contacts 54a, and the completion of a circuit from the line 52 through a motor RM, a clutch magnet RCM, the contacts 54a and contacts L3, SP and P3 to the line 56. The clutch magnet RCM engages a clutch to couple the motor RM to the printing mechanism and reading-out mechanism by which the totals on the counters are transferred to the printing mechanism. The machine then performs a total printing cycle in the normal manner but no totals are actually printed since none have yet been obtained. During this cycle, the cam contacts P16 close to energize the relay 43 which as explained previously closes the contacts 43a and opens the contacts 43b to prepare the circuit through the translators.

During this total printing cycle, cam contacts P12 close to complete a circuit from the line 52 through the units counter magnet 25, contacts 58b closed by the relay coil 58, the contacts P12, the switch 51 and the contacts LCLC2 to the line 56. The magnet 25 advances the units counter to register 01. The units counter and the translator now both contain the same number, viz. 01, so that a serial connection extends through them between the brushes 40 as traced previously. Later in the cycle, cam contacts P15 close and complete a circuit from the line 52 through a relay coil 59, the contacts P15, one brush 40, the translators and units counter to the other brush 40, the switch 51 and the contacts LCL2.

The coil 59 opens its contacts 59a and closes its contacts 59b to establish a holding circuit for itself through the contacts 59b and P10 and the switch 50. The opening of the contacts 59a deenergizes the relay coils RC, 57 and 58. The deenergization of the coil 57 allows the contacts 57a to close so that, on the closure of contacts P4, the circuit for the clutch magnet CFM and coil 53 will be completed in a known manner and the motor TM reenergized. The deenergization of the coil RC allows its contacts RC1 to close so that contacts P1 may operate in a known manner to break the circuit through the motor RM and coil 43, the magnet RCM and the contacts RCM1. The machine then resumes card feeding operations, the cards being fed first past the upper brushes and then past the lower brushes. As each card passes the lower brushes, the amounts it contains are read and entered in a known manner into the counters to obtain the totals for the group No. 01.

The machine is provided with automatic group control circuits, not shown, which, in a known manner, compare the group number on the card passing the lower brushes with that on the card passing the upper brushes and maintain the contacts MC closed so long as these numbers agree. When, however, the last card of the first group passes the lower brushes and the first card of the second group passes the upper brushes, the contacts MC will be opened in a known manner and interrupt the holding circuit through the coil 53 and magnet CFM so that the latter are deenergized on the opening of the contacts L1. As this series of operations is well known it will not be described in detail. The machine has now obtained the totals for group No. 001 and the last two figures of the second group are registered in the translators while the units counter registers 01. The circuit through the motor RM is then established as before and a total printing cycle ensues in which the totals for group No. 001 are printed and the strip is line spaced to bring "sheet" No. 002 to the printing line in a known manner and the counters are reset.

At the beginning of this cycle, the coil 59 is energized over the contacts 59b and P10 and the switch 50 while the coils RC 57 and 58 are deenergized. Early in the cycle the contacts P12 close and energize the units counter magnet 25 over the contacts 58a and plug wire 46. The units counter is thus advanced to register 02. Later the cam contacts P10 open momentarily. If the second group is group No. 002 the setting in the translators and units counter will agree and a connection between the brushes 40 will exist in parallel with the contacts P10 so that the coil 59 will remain energized, the contacts 59a will remain open and the contacts 59b closed. Since the contacts 59a are open the coils RC and 57 will not be energized and their contacts will remain closed allowing the machine to resume card feeding and adding at the end of one total printing cycle.

Assume now that the second group was group No. 004 so that the translators register 04. When the contacts P10 open, the parallel connection through the translators and units counter will be interrupted owing to the two numbers registered being different. Consequently, the opening of the contacts P10 will deenergize the relay 59 and the contacts 59a will close and the contacts 59b open. Then, when the contacts P10 reclose, the relay coils RC, 57 and 58 will be energized through the contacts 59a and P10 and the switch 50. The coil 57 opens the contacts 57a so that the circuit through the contacts P4, the magnet CFM and the coil 53 cannot be completed, while the coil RC opens the contacts RC1 interrupting the circuit through the contacts P1 so that the latter cannot operate to deenergize the motor RM and magnet RCM.

The machine will then perform a second total printing cycle in which the contacts P12 will energize the units counter magnet 25 through the contacts 58b, advancing the units counter to register 03. The strip will be line spaced to bring "sheet" or line No. 003 to the printing line during this cycle but nothing is printed as the counters have been reset to zero during the preceding cycle.

When the contacts P15 close, there will still be no connection between the brushes 40 since the translators register 04 and the units counter 03. The coil 59 will thus remain deenergized and the coils RC, 57 and 58 will be reenergized when the contacts P10 reclose after opening momentarily. The machine will then commence a third total printing cycle.

During this cycle the strip is again line spaced to present "sheet" or line No. 004 to the printing line and the units counter is advanced to register 004. Now, when the contacts P15 close, a circuit will be completed through the coil 59, contacts P15, one brush 40, the translators and units counter, the other brush 40, the switch 51 and the contacts LCLC2. The coil 59 will open the contacts 59a so that the relays RC, 57 and 58 will be deenergized and close the contacts 59b so that the coil 59 will be held energized through the contacts P10 when they close after opening momentarily. The contacts RC1 and 57 are closed at the end of this cycle since the corresponding coils are deenergized so that the machine will resume card feeding and adding with group No. 004, the totals of which will be printed on lines or "sheet" No. 004 of the strip.

The machine continues to operate in this manner and printing the total for each group on the corresponding line of the strip and leaving blank lines for groups missing from the series, until the last card has passed the lower brushes when it stops in a known manner.

When a machine of this kind is adjusted to list, it prints the items constituting the total for a group in the form of a list having one line for each card in the group and one line for the total. By providing the machine with auxiliary sheet feeding mechanism which feeds the strip to a variable extent after each total printing cycle, it is possible to arrange for the first line of printing relating to each group to be spaced to a constant extent from the first line of printing relating to the preceding group so that the strip can subsequently be divided into separate sheets each containing the items and total for a single group.

Hitherto one such "sheet" has been produced for each group of cards actually present in a series of groups. This procedure is frequently employed for preparing statements of account for dispatch to customers and it is desirable in such cases (and in other cases also) to print on each sheet the name and address of the customer. This is usually done as a separate operation in an addressing machine employing stencils. Each customer is assigned a serial group number and a stencil is provided for each customer. In general, it will not be necessary to send a statement to every customer since no transactions will have occurred with some of them. There will be no groups of cards relating to such customers in the series of groups passed through the machine and consequently no statement will be produced by the machine as hitherto arranged. It is therefore necessary to remove the stencil cards relating to such customers before the addressing operation is performed. The operations of sorting out the unwanted stencils and subsequently re-inserting them wastes time and leads to a possibility of errors that may result in a large proportion of incorrectly addressed statements.

The present machine can be operated to produce a statement for each customer whether or not there are any cards relating to that customer so that the statements can be addressed in an addressing machine without any selection of stencils being necessary. This reduces the possibility of error to small proportions and saves time. It also renders it possible to pre-stencil or pre-type the names and addresses properly spaced and in proper order on the strip without reference to whether or not a statement is required for each customer.

The sheet feeding mechanism is shown in Figs. 4 to 8 inclusive. The machine is provided with a total printing shaft 60 which is driven by the motor RM during total printing cycles only and a listing shaft 61 driven by the motor TM during card feeding cycles only. A ratchet 62 is secured to the shaft 60 and cooperates with a spring pressed pawl 63 pivoted on a gear wheel 64 which is loose on the shaft 60. The gear wheel 64 meshes with a gear wheel 65 loose on the shaft 61 and carrying a pawl 66. This pawl cooperates with a ratchet 67 secured to the shaft 61. It will be seen that the gear wheel 64 may be driven anti-clockwise by either shaft 60 or 61, and may thus rotate either during total printing cycles or during card feeding cycles. As shown in Fig. 9 one journal 68 for the shaft 61 is formed with a cam surface 69 with which cooperate two pins 70 on a sleeve 71. The sleeve is pressed to the left (Fig. 9) by a spring 72 and is provided with a cam surface 73. In the position shown the pawl 66 can engage the ratchet 67 but when the sleeve is rocked clockwise by means of a manual lever 74, it is pressed to the right by the cams 69 engaging the pins 70 until the cam surface 73 engages a pin 66a carried by the pawl 66 and lifts it out of engagement with the ratchet 67. With this adjustment the shaft 61 does not drive the gear wheel 64 which thus rotates during total printing cycles only.

The gear wheel 64 drives a gear wheel 75 (Figs. 4 and 5) through a train of wheels 76. The wheel 75 is loosely mounted on a shaft 77 and is secured to a ratchet wheel 78. A disk 79 is secured on the shaft 77 and has a pawl 80 pivoted to it at 82. The pawl has an outwardly extending arm 81 and is pressed towards the ratchet 78 by a spring 83. The pawl is normally held away from the ratchet wheel by the engagement of a pin 84 on it with a lever 85 also pivoted at 82. The lever 85 also has an outwardly extending arm 86, and is connected by a link 87 to a lever 88 pivoted at 89. The free end of the lever 88 is connected to a spring 90 pivoted at 91. The spring tends to hold the levers 88 and 85 in the position shown and the pawl 80 away from the ratchet wheel.

On the energization of a magnet 95, the armature 94 is rocked counterclockwise and an extension 93 of the armature engages a pin 96 on the lever 85, rocking the latter counterclockwise. This rocks the lever 88 clockwise against a stop 97. The lever 88 and spring 90 form a toggle that is thus moved from one side to the other of its dead center so that the spring now tends to hold the parts in the new position. The pawl 80 is now free to engage the ratchet 78 so that the shaft 77 will rotate with the ratchet and the gear wheel 75. The shaft rotates until the extensions 81 and 86 (Fig. 5) engage the end of a member 98 (Fig. 4) adjustably positioned in their path and are rocked clockwise back to the position shown in Fig. 5. The shaft 77 is then uncoupled from the gear wheel 75.

A gear wheel 99 (Fig. 4) is secured on the shaft 77 and meshes with a gear wheel 100 on a spring barrel 101. The wheel 100 meshes with a gear pinion 102 (Fig. 5) driving a governor 103. When the shaft 77 is uncoupled from the gear wheel 75, the spring barrel 101 rotates it clockwise (Fig. 4) under the control of the governor 103 until it reaches the position shown in Fig. 5 where a pin 104 on the disk 79 engages a fixed stop 105.

The member 98 (Fig. 4) is secured to a member 105 mounted to rotate in a side plate 106 of the unit about the shaft 77. An arm 107 (see also Fig. 8) is secured to the member 105 and carries a knob 108. This arm is formed with slots 109 and 110, the former of which is engaged by a knob 112 secured to a member 111 (see Fig. 4) and the other by an eccentric 114 (Fig. 8) pivotally mounted in the member 111. By rotating a knob 115 the eccentric 114 can be rotated to move the lower end of the member 111 slightly to one or the other side relatively to the arm 107. The member 111 is pressed downwardly by a spring 113 so that a tooth 116 on its lower end engages a toothed disk 117 secured to the plate 106 and locks the member 105 and the member 98 (Fig. 4) to the plate 106. The member 98 can be adjusted by pressing the knobs 108 and 112 together to lift the tooth 116 away from the toothed disk 117 and rotating the arm 107 and member 105.

The parts are locked in the new position by the tooth 116 engaging the disk 117. The disk 117 is marked in numerals indicating the number of lines of printing that can be made on a sheet, i. e. sheet lengths, and the parts are adjusted so that the desired number shows in a window 118. A counterclockwise adjustment by one tooth of the disk 117 increases the sheet length by one line space. A fine adjustment can be effected by rotating the eccentric 114 to move the tooth 116 relatively to the arm 107 and member 105. This fine adjustment is made when the mechanism is assembled and need not be altered subsequently.

It will be seen that when the magnet 95 is energized, the shaft 77 turns to an adjustable extent determined by the adjustment of the member 98 (Fig. 4) in accordance with the length of the sheet spacing movement desired and is then returned to the position shown in Fig. 5.

A disk 119 (Fig. 4) is secured to the shaft 77 and carries a pawl 120 cooperating with a ratchet wheel 121 which is secured to a gear wheel 122 loose on the shaft 77. The gear wheel 122 meshes with a gear wheel 123 secured to a shaft 124, the gear ratio being three to one. The arrangement is such that the shaft 124 turns at three times the speed of the shaft 77 while the latter is driven counterclockwise but is idle during the return movement of the shaft 77.

A disk 125 (Figs. 4 and 7) is secured on the shaft 124 and a disk 126 is loose on this shaft but is pressed into frictional engagement with the disk 125 to rotate therewith. Two spring pressed pawls 127 and 128 (Figs. 6 and 7) are pivoted on a pin 129 on the disk 125 and cooperate respectively with a multi-toothed ratchet wheel 130 and a single toothed wheel 131 which are secured to a shaft 132. A platen 133 round which the paper strip passes is splined on this shaft and rotates therewith.

The pawl 127 has a pin 134 (Fig. 7) extending through a suitable opening in the disk 125 into a cam slot 135 in the disk 126. The ratchets 130 and 131 can be driven clockwise by the shaft 132 when the platen is rotated clockwise by the usual line spacing mechanism. In the positions shown in Fig. 7 the shaft 124, when it rotates, will drive the shaft 132 through the pawl 127 to a corresponding extent, consequently on each energization of the magnet 95, the platen will be rotated to a constant, but adjustable, extent. This allows of a constant but adjustable space being left between a total and the next printed line to receive a heading.

The pawl 127 can be rendered inoperative by manually rotating the disk 126 clockwise so that a cam surface 135a of the slot 135 lifts the pawl away from the ratchet 130. It will be assumed hereinafter that this adjustment has been made so that the shaft 124 can only drive the platen through the pawl 128 (Fig. 6).

The pawl 128 has a pin 136 engaging a spiral groove 137 in a disk 138 which is secured to the shaft 132. As the platen is rotated during line spacing operations the tooth 139 of the ratchet 131, moves away from the nose of the pawl 131 and simultaneously the pawl is rocked outwardly by the rotation of the disk 138, the pin 136 moving along the groove 137. The pitch of the groove is greater than the height of the tooth 139 so that after one revolution of the platen the pawl 128 will be clear of the tooth 139.

The operation will be clearer from a specific example. Assume that the member 98 has been adjusted to allow the shaft 77 to turn through two-thirds of a revolution whenever the magnet 95 is energized so that it will drive the shaft 124 through two revolutions. Assume also that the platen has been rotated through one and a half revolutions by line spacing operations so that the ratchet 131 and disk 138 are displaced one and a half revolutions relative to the pawl 128 from the position shown in Fig. 6. When the magnet 95 is energized, the shaft 124 and pawl 128 will turn through two revolutions.

At the end of one half revolution, the pawl will be radially above the tooth 139 but will be held by the groove 137 away from the tooth. The pawl can thus turn for another revolution before it engages the tooth and drives the platen. The latter will thus turn through only half a revolution. It will be clear that the extent to which the platen turns on the energization of the magnet 95 will always be the difference between the extent to which the shaft 124 turns, which is adjustable, and the extent to which the platen has been turned to line space the strip since the magnet 95 was last energized. Thus the strip will be fed to a constant, but adjustable, extent between each two successive energizations of the magnet 95.

There will now be explained the manner in which the machine prepares "sheets" one for each possible group and each containing, if a corresponding group of cards passes through the machine, a list of items and a total.

The sheet feeding mechanism of Figs. 4 to 9 is adjusted to give the desired length of sheet as explained above, the pawl 127 (Fig. 7) is rendered inoperative and the pawl 66 (Fig. 5) is also rendered inoperative, so that the sheet feeding mechanism only operates during total printing cycles. The machine circuits are adjusted as in the first example above except that the plug connection 48 is made. Further, the machine is adjusted to list in a known manner, and the first numbered sheet of the series is adjusted to printing position and the units counter wheels set to indicate one less than the commencing number.

The machine is started as previously explained and, as before, a total printing cycle occurs when the first card is about to pass the lower brushes. Midway through this cycle cam contacts P13 close but no circuit is completed through them because contacts 140a in series with them are still open so that the first sheet remains at printing position.

After the contacts P13 have reopened contacts P14 close and complete a circuit through relay coils 140 and 141. The latter closes contacts 141a to provide a holding circuit for both ends which circuit is maintained until the contacts LCLC2 open after the last card has passed the lower brushes. The coil 140 closes the contacts 140a so that the feed control magnet 95 will be energized when the contacts P13 close during succeeding total cycles.

The subsequent operations of the machine are similar to the operations described in connection with the first manner of operating the machine described above except that the items read from the cards are printed and that the magnet 95 is energized through the contacts P13 midway through each total printing cycle, except the first one when the contacts 140a are open. If a total printing cycle immediately follows a card feeding cycle, the sheet feeding mechanism operates, when the magnet 95 is energized, to feed the strip to an extent, less than the full sheet length, such that the first line on the next sheet is brought to the printing position. During a total printing cycle that follows another such cycle, the sheet feeding mechanism operates to feed the strip through the full length of a sheet so as to produce a blank sheet.

It will be obvious that the machine could be operated with the adjustment just described except that it was to tabulate instead of to list. The machine would then produce sheets each containing a single line of printing representing totals. If the sheet feeding mechanism is adjusted to produce short sheets of, say, two line spaces in length, the machine would produce a list of totals as in the first example.

For certain purposes, it may be desirable to prepare a list of items from a series of serially numbered cards some of which are missing, there being one line in the list for each possible card. This would enable a payroll to be prepared on a sheet preprinted with the names of the employees, one of each line, even if there is nothing to print on certain lines. To do this the sheet feeding mechanism of Figs. 4 to 9 is adjusted to give the desired sheet length which would be two or three line spaces if a list is desired or more if the strip is to be divided into separate sheets. The pawl 66 is rendered operative by adjusting the lever 74 to the position shown, so that the sheet feeding mechanism will operate during card feeding cycles as well as printing cycles. The machine is adjusted to list but not to bring about total printing on a change in the serial numbers on the cards so that it will treat all the cards as one group.

The switches 44 and 51 are closed, the switch 50 is opened, and the plug connections 47, 48 and 49 are made but the plug connection 46 is omitted.

The machine is started and operates as in the second example above as far as, and including the first total printing cycle. If the serial numbers registered from the first card agrees with the number registered in the units counter the machine proceeds to list the data on the first card as it is fed past the lower brushes otherwise one or more further total printing cycles occur.

Let us assume that for a group of sheets, numbers 51 to 55, only the cards 52, 53 and 55 are present. The serial counter must therefore be set to 50, i. e. one less than the commencing figure and the sheet 51 adjusted to the printing position.

During the initial total printing cycle, the units counter is advanced to register 51, but the translators register 52, so that the coils 59 remain deenergized and the coils RC 57 and 58 remain energized. Also during this cycle the coils 140 and 141 are energized and close their contacts 140a, 141a thus preparing the magnet 95 for energization in the following cycle. The machine will then perform another total printing cycle during the first part of which the contacts 58b will be held closed by the coil 58. While these contacts are closed the contacts P12 close and energize the units counter magnet 25 which advanced that counter to 52. The contacts P13 will also energize the magnet 95, and the sheet 51 will thus be fed out of the platen unprinted and the sheet 52 will be fed in. The coil 59 is then energized over the circuit, previously traced, through the translators and units counter and the machine will commence card feeding at the end of the cycle as explained previously. During the ensuing card feeding cycle, the data on the first card is read by the lower brushes and printed, and, after it has been printed, the magnet 95 is energized through contacts L22 which operate during card feeding cycles only and the strip is fed one sheet length to bring sheet 53 to the printing position. The coil 43 is not energized during this cycle as its circuit is broken by the contacts 54a being held open by the coil 54 which is now energized. Consequently the contacts 43b are closed, connecting the brushes 42 of the translators to the studs 17 of the units counter. Early in the cycle cam contacts L21 close and complete a circuit through the plug connection 47, the contacts 58a which are closed since the coil 58 is now deenergized and the magnet 25 which advances the units counter to register 53. As the second card passes the upper brushes its serial number 053 is read and 53 is registered on the translators.

At the moment when one set of the latches 31 has completely passed the trip lever 32 and the registration of 53 is completed, cam contacts L20 open momentarily. While these contacts are open the brushes 42 of the translators are each in engagement with the corresponding segments 39, the position being that which would be obtained by shifting the brushes 41 and 42 downwardly (as seen in Fig. 1) by three times the spacing of the brushes from the position shown in Fig. 1. Since the translators and units counter register the same number, the brushes 40 will be electrically connected together and the circuit through the coil 59 will be held around the contacts L20. These contacts reclose before the parallel circuit is broken by the brushes 42 leaving the segments 39 so that the coil 59 remains energized and the coils RC, 57 and 58 deenergized. The machine will then perform a second card feeding cycle, printing the data from card No. 053 on sheet 53 which is fed out, sheet 54 being fed in, and registering the serial number from card No. 055 in the translators. The units counter is advanced to register 054 so that, when the contacts, L20 open, there will be no parallel circuit through the translators and the units counter which contains different numbers. Thus the coil 59 is deenergized and its contacts 59b will close. Then, when the contacts L20 reclose, the coils RC, 57 and 58 will be energized through the contacts 59a and the machine will stop card feeding and perform a total printing cycle, involving sheet feeding, similar to that initiated because the first card was card No. 052 and not card No. 051. The machine continues to operate in this manner performing a card feeding and listing cycle for each card present and a total printing and sheet feeding cycle for each card missing.

It will be apparent that the sheet feeding mechanism need not be used when a list of items is required if the line spacing movement effected by the line spacing mechanism during an item printing cycle is the same as that effected during a total printing cycle. It is, however, the usual practice to arrange for the latter movement to be double the former so that the sheet feeding mechanism must normally be used to ensure that the strip is fed to the same extent in every cycle.

It will be seen that each card is treated as a group but that, since the automatic group control circuits are not operative, the machine does not print a total for each card. It would be possible to produce a list of items by adjusting the machine to tabulate and to print a total for each of the cards which would each constitute a group. This would result in the machine performing a card reading cycle and a total printing cycle for each one card group as in the first example and the sheet feeding mechanism need not be used. This method of operation would, however, nearly double the number of cycles required, two being required for each card instead of one, and thus is not preferred.

Having now particularly described and ascertained the nature of the said invention, and in what manner the same is to be performed, I declare that what is claimed is as follows:

1. In a machine of the class described, paper spacing mechanism operable to advance a record strip, line by line or section by section, a counter operable to count the number of paper spacing operations, record analyzing means for analyzing data on record cards, a register controlled by said analyzing means, and means jointly controlled by said counter and said register for causing a succession of operations of said paper spacing mechanism.

2. In a machine of the class described, paper spacing mechanism operable to advance a record strip in increments, a counter settable in accordance with a predetermined number, means for advancing said counter one unit for each operation of said paper spacing mechanism, a record controlled register settable in accordance with a number derived from a record card, and means jointly controlled by said counter and said register for repeatedly operating said paper spacing mechanism until said counter has been advanced to the number entered in the register.

3. In a machine of the class described, means for analyzing record cards arranged in serial order, paper spacing mechanism operable to advance a record strip in increments, means for operating said mechanism once for each card analyzed, means for reading the serial numbers on the records and means controlled thereby for effecting additional repeated operations of said paper spacing mechanism equal in number to one less than the difference between the serial numbers of two successive cards.

4. In a machine of the class described, means for analyzing groups of record cards arranged in serial order, paper spacing mechanism operable to advance a record strip in increments, means for operating said mechanism once for each group of cards, means for reading the serial number of each group and means controlled by said reading means for effecting an additional operation of said paper spacing mechanism for each possible group necessary to complete the series of groups.

5. In a machine of the class described, means for feeding a record strip arranged in sections, means for feeding and analyzing groups of record cards arranged in consecutive order of serial numbers, in which one or more serial number groups may be missing, and means controlled by said analyzing means for controlling the operation of said record strip feeding mechanism whereby an operation thereof will be effected for each possible group in said series irrespective of whether or not the series is complete.

6. In a cyclically operated machine of the class described, sheet feeding mechanism operable for each cycle of operation of the machine, a counter adapted to add one unit for each cycle of operation, a record controlled register adapted to receive a number from a record card, means for comparing the settings of said counter and register and means controlled thereby for controlling the further operations of said sheet feeding mechanism.

HAROLD HALL KEEN.